(12) United States Patent
Richards

(10) Patent No.: US 6,243,693 B1
(45) Date of Patent: *Jun. 5, 2001

(54) TOKEN-OPERATED APPARATUS FOR COMMUNAL PREPAYMENT WATER MANAGEMENT

(75) Inventor: Wayne Noel Richards, Kwa Zulu Natal (ZA)

(73) Assignee: Merlin Gerin S.A. (Proprietary) Limited, Gauteng (ZA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,100
(22) Filed: Feb. 10, 1998
(51) Int. Cl.[7] .................................................. G06F 17/00
(52) U.S. Cl. ............................................ 705/412; 73/861
(58) Field of Search ........................ 705/412; 73/152.51, 73/30.03, 1.73, 861

(56) References Cited

U.S. PATENT DOCUMENTS

| | | | |
|---|---|---|---|
| 4,216,529 | * 8/1980 | Krystek et al. | 705/413 |
| 4,351,028 | * 9/1982 | Peddie et al. | 364/483 |
| 4,777,354 | * 10/1988 | Thomas | 235/380 |
| 5,146,067 | * 9/1992 | Sloan et al. | 235/381 |
| 5,528,507 | * 6/1996 | McNamara et al. | 364/483 |
| 5,717,597 | * 2/1998 | Kara | 364/464.18 |

FOREIGN PATENT DOCUMENTS 2 745 823 * 9/1997 (FR).

OTHER PUBLICATIONS

Vic Wyman, "Meters fail to make a splash", Mar. 26, 1992, The Engineer, p 27.*
Vic Wyman, "Water firms try out smart card metering to combat bad debt", Mar. 19, 1992, The Engineer, p10.*

* cited by examiner

Primary Examiner—James P. Trammell
Assistant Examiner—Thomas A. Dixon
(74) Attorney, Agent, or Firm—Young & Thompson

(57) ABSTRACT

A system and apparatus for controlling and measuring the flow of water delivered per transaction of a community water management arrangement, the apparatus having an inlet and outlet, a meter to determine the volume of water delivered and also to adjust data contained in a customer data device, the data device being presentable to an interface for a time period chosen by the customer for a predetermined volume of water, the metering unit and regulator being stopped by removable of the data device or by a management station signal, the management station being capable of receiving information directly from the personal consumer data device and from the personal consumer data device via the apparatus.

1 Claim, 4 Drawing Sheets

TOKEN-OPERATED APPARATUS FOR COMMUNAL PREPAYMENT WATER MANAGEMENT

FIELD OF THE INVENTION

This invention relates to a token-operated device for measuring consumption of water.

BACKGROUND OF THE INVENTION

Non-payment of bills for water services has become a major problem to the service providers. Consequently a number of inventions have been propagated in an attempt to provide a way of supplying these services on a pre-payment basis.

A number of these systems involve the purchase of tokens which are then inserted into a device which activates the supply point on the consumer's premises.

Unfortunately, persons have found methods of duplicating or simulating the tokens used or tampering with the device at the supply point. It is therefore an object of this invention to provide a system which overcomes these problems.

SUMMARY OF THE INVENTION

According to the invention apparatus for prepayment water management includes a

- an inlet and outlet for flowing water
- a metering unit for the flow of water therethrough
- a regulator to start and stop the flow of water
- a data device interface capable of receiving data from a data device relating to customer identification and available credit
- such data being transferable to a management station for permissibility of a transaction based on available credit
- the management station being capable of recordal of a transaction
- and means to activate the regulator for a predetermined and permissible volume of water through the metering device.

The recordal of the transaction by the management station is preferably transferable back to the data device interface for adjustment of available credit.

The means for activating the regulator may be monitored and controlled by the management station—for example so that the credit availability on the data device is not exceeded. The information regarding the transaction which is captured by the management station may be recorded and may be able to be printed out.

In the preferred form of the invention, the data device is a memory type device or a microprocessor type device used for the receiving and transferring of information. In one form of the invention where the situation arises, the information or data is stored and modified on the data device when it interacts with the prepayment metering unit or point of sale vending unit, or the management system.

The data may be loaded with credit and a price tariff structure, on presentation to the prepayment metering device via the data device interface. The management station may validate the authenticity of the data device, type of data device (being management or consumer), function required to perform, credit available, period of use and price tariff structure. When this validation process is complete, the data device credit information is debited per volume of water to be released and the regulator is allowed to be opened. On receipt of a signal via a probe or read switch from the meter when a predetermined volume has flowed, the data device is again debited and the consumption record credited. The management statement then records its own volume delivered; any monies received and updates this information to the data device. This form of prepayment in the prepayment metering device and modification of information on the management station and the data device and the transfer of information to and from the communicating items is repeated and repeated until a transaction with the consumer is completed.

The transaction with the consumer may be completed when the consumer removes the data device from the data device interface. Upon this removal, the management station may recognize that the data device has been removed and send a signal to the regulator to close.

In this form of the invention, the data device acts as the tap that a consumer would normally manually open and close. The consumer is able to determine their current status (credit available) via a consumer interface which could be a LCD or an LED or an audio type device. The prepayment-metering unit may be self-contained device and its power source may be derived from its own internal solar battery and/micro hydro generator, which uses the flow of water the consumer is drawing of to provide its energy to function.

Further to the above, certain circumstances arise where tampering or vandalism is apparent, the prepayment metering device has a tamper device in communication with the PC board. When physical tampering is detected by means of the lid of the unit being open or excessive blows being exerted on the prepayment-metering device, the management station will close itself down into a tamper mode. This can be reset when the management station has been initiated by a tamper-reset function on presentation to the data device interface.

The management station is able to gather data and information from the prepayment metering device such as volume delivered, monies received, power source status, operational status, consumption logging from management data devices that are initiated from the management statement to communicate with the prepayment metering device on presentation with the data device interface on the prepayment metering device. The management station will transfer the information requested a management data device. This information may then transferred to a management system for analysis.

The above information may also be transferred to a system via the consumer data device after each time the consumer data has been presented to the data device interface on the prepayment metering device. When the consumer needs to purchase more credit, the consumer's data device would then be presented to or be in some mode of communication with a point of sale vending unit which would then load new credit and tariff structure onto the data device and at the same time it would also record the information transferred from the prepayment metering device that is on the data device to itself. When the point of sale vending unit is in communication with the management system, via communication interface of some form, being via modem or interface cable this information that has been stored is then transferred to the management station.

Likewise the consumer data device can also communicate in this way directly with the management station for the transfer of this information on presentation to the management station's data device interface. This then reduces the need for management personnel to physically communicate with the prepayment-metering device as the consumer now takes over that function automatically. In the case where information is required before being retrieved from the consumer, the management station is able to initialize management data devices to communicate with the prepayment metering device on presentation to the data device interface. The transfer of information then takes place and is then transferred via the management data device to the management station.

In another form of the invention, all operation and transfer of information and interfacing remains the same except in the metering a power source, this being the meter and the existing power source being replaced with a micro hydro generator and metering device combination unit, comprising an inlet and outlet for the water passing an impeller, which rotates a magnet surrounded by coils, to spin and thereby generate electricity for the power of the prepayment-metering unit. This impeller also measures the flow of water and converts that flow to electronic pulses via a probe or read switch.

BRIEF DESCRIPTION OF THE DRAWINGS

Several embodiments of the invention are described below with reference to the accompanying drawings, in which.

DETAILED DESCRIPTION OF THE INVENTION

Figure 1:
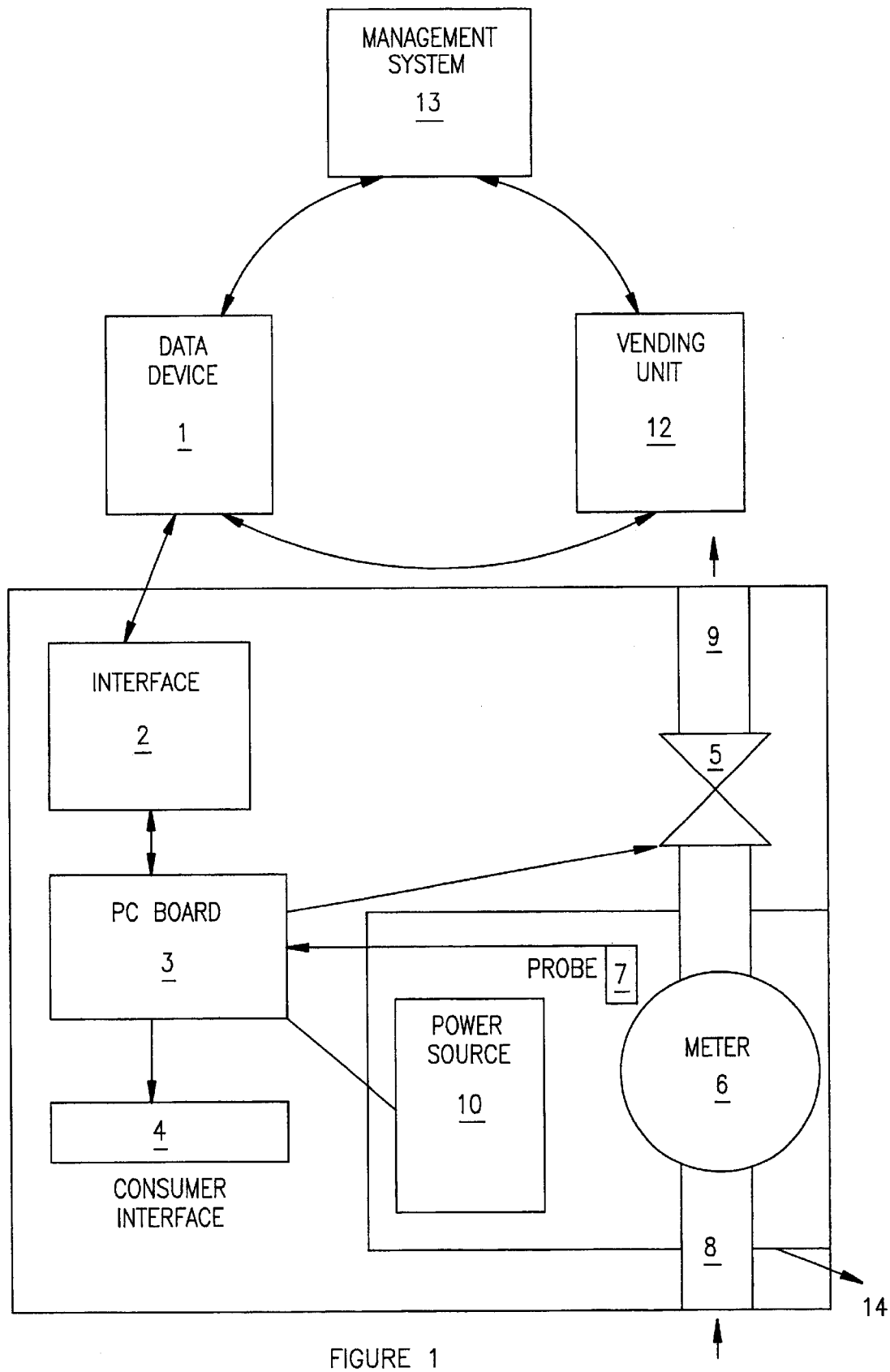
FIG. 1 is a block diagram of a typical arrangement according to the invention.

With reference to FIG. 1 a data device (1) is encoded with information regarding credit, price tariff structures, consumer information, area identification, security information, historical records and other management information from a management system (13). Information can also be added or retrieved from the data device (1) by the point of sale vending unit (12).

The data device (1) is presented to the data device interface (2), which is in communication with the PC board (3), which verifies the authenticity of the data device (1). When the authenticating process is complete, the PC board (3) communicates with the data device (1) transferring information to and from itself to the data device (1).

The PC board (3) sends a signal to the regulator (5) to open allowing the flow of water through an inlet (8) a metering device (6) which measures the flow of water and converts that flow to signals by means of a read switch/probe (7). The flow of water continues through a regulator (5) and finally an outlet (9).

Each time the PC board (3) receives a signal from the meter (6) via the read switch/probe (7), information is updated on itself and on the data device (1). The PC board (13) also communicates the current status with the consumer via a consumer interface (4). The consumer interface (4) will also communicate the current operational status of the entire prepayment-metering unit.

In one embodiment of the invention, the prepayment-metering device is used to serve multiple consumers. In this instance, on presentation of the data device (1) to the data device interface (2), after the validation process with the PC board (3), the data device (1) behaves as a tap. On presentation, the PC board (3) allows the regulator (5) to open thereby allowing the flow of water through the meter (6) which is monitored via the read switch/probe (7) and the information on the PC board (3) and the data device (1) are modified with the latest information.

On removal of the data device (1), the PC board (3) detects that removal and closes the regulator (5).

The prepayment-metering unit is a self-contained unit with its own internal source of energy/power (10). This can be in the form of a solar panel or a battery, which are not reliant on conventional mains electricity.

An alternative embodiment of the invention is the replacement of the power (10) and the meter (6) with a combined micro hydro generator/meter (14).

Another embodiment of the invention is used in the case where only one consumer is to use the prepayment-metering device. The data device (1) is presented to the data device interface (2), which allows communication with the data device (1), and a transfer of information takes place. Credit is transferred from the data device (1) to the PC board (3) and is communicated to the consumer via the consumer interface (4). Information stored on the PC board (3) is then transferred to the data device (1), which can then be removed The PC board (3) then allows the regulator (5) to be opened for the flow of water to take place. The flow of water is monitored by the meter (6) which converts that flow into signals via the read switch/probe (7), which are sent to the PC board (3). When the credit purchased by the consumer had depleted, the PC board (3) will instruct the regulator (5) to close. The regulator (5) will only open when new credit is received.

A further embodiment of the invention is the management functions and transfer of information from the management system (13) to the point of sale vending unit (12) or to the data device (1), which can communicate with the prepayment-metering unit.

Management functions are performed by initializing data devices (1) with the management system (13), that on presentation to the prepayment-metering unit certain management functions will be performed. Meter reading, water balancing, information and operational status of the prepayment-metering unit can then be gained electronically. These functions can also be gained from the data device (1) that is used by the consumer.

Figure 4:
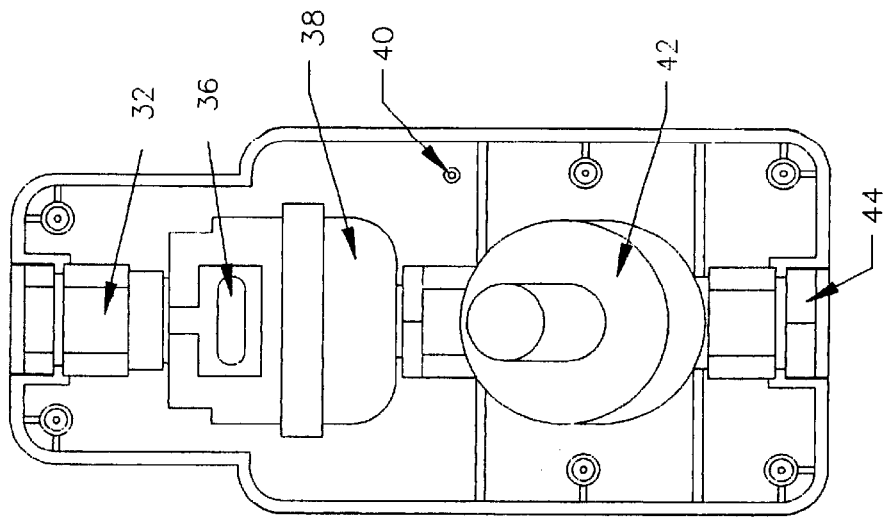
FIG. 4 is a plan view of the inside of the unit.
Figure 3:
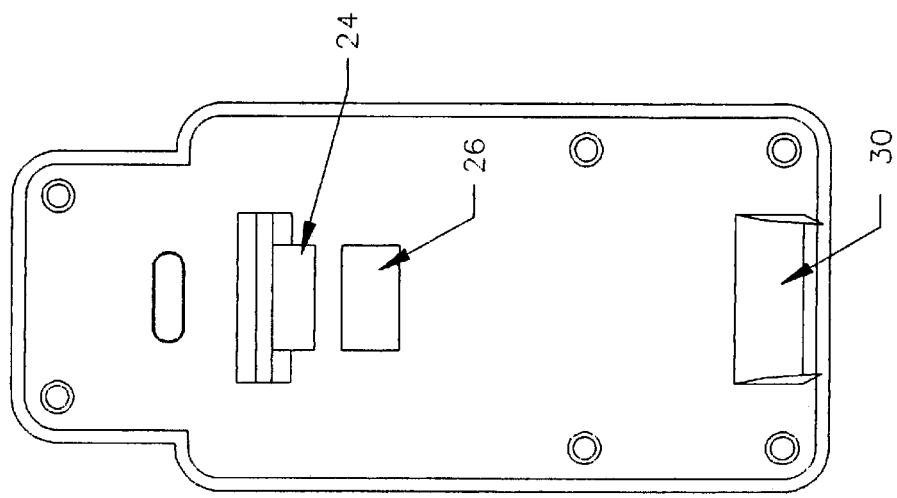
FIG. 3 is a top view of the lid.
Figure 2:
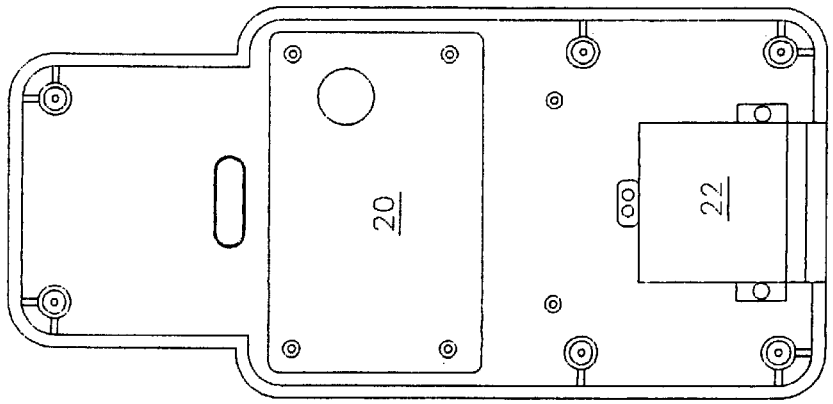
FIG. 2 is an underview of the lid of a typical unit embodying the invention.

Referring now to FIGS. 2 to 4, the essential integers are the PC board 20, the data interface 22, the LCD display 24, solar battery 26, a slot 30 for a card, and inlet 32 for water, a display 36 for the flow meter 38, a tamper switch 40, regulator 42 and outlet 44.

A micro hydrogenerator may be interposed between the inlet 32 and the flow meter 38.

Figure 5:
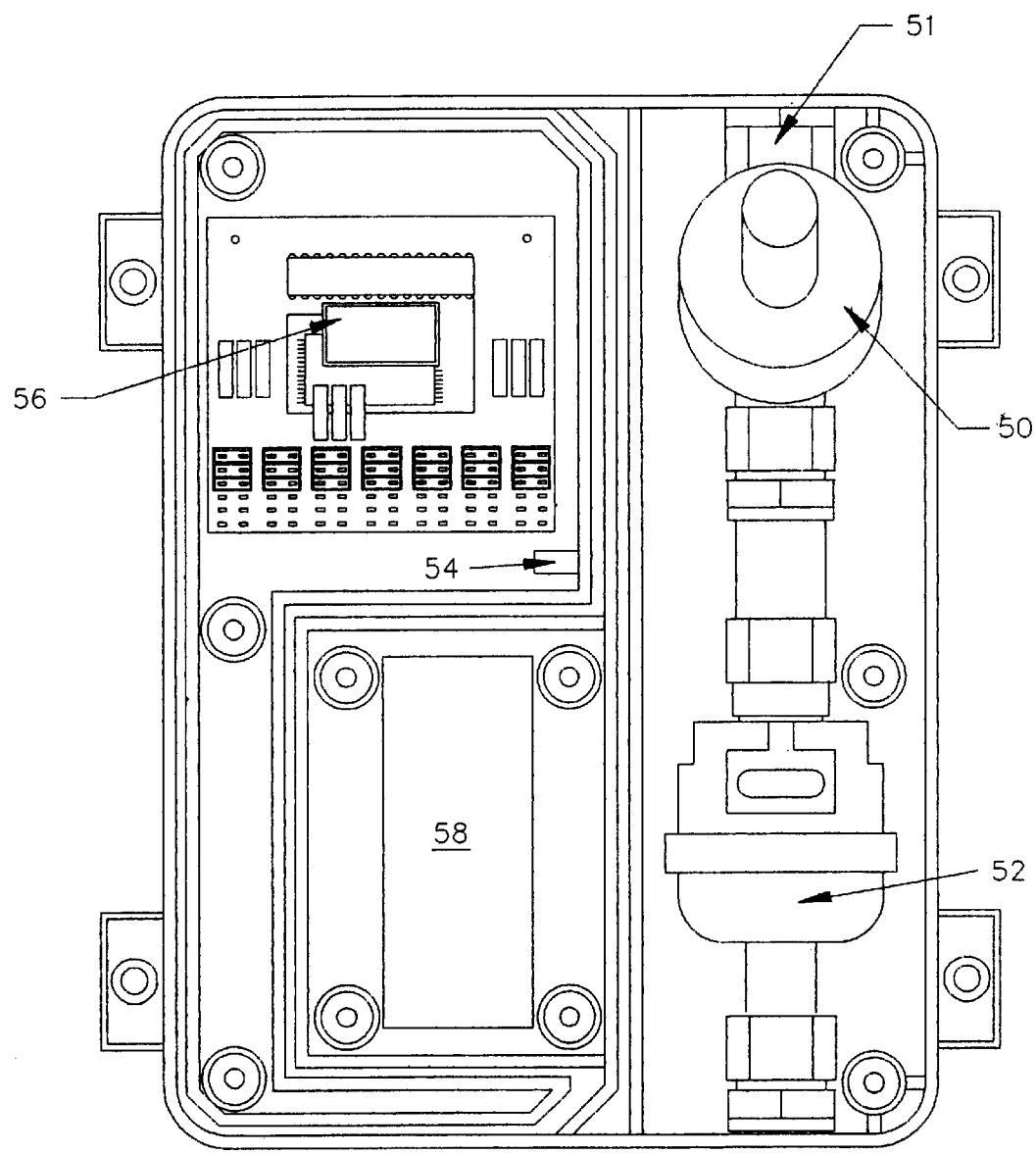
FIG. 5 is a face view of a unit for use with a community stand pipe.

In FIG. 5 a diaphragm valve 50 controls the water inlet 51, the flow of water being metered by the meter 52. A lid switch 54 is provided as well as an LCD display 56. A battery 58 provides the source of electrical current but it will be appreciated that a solar energy device may also be used as well as a micro hydrogenerator.

Figure 6:
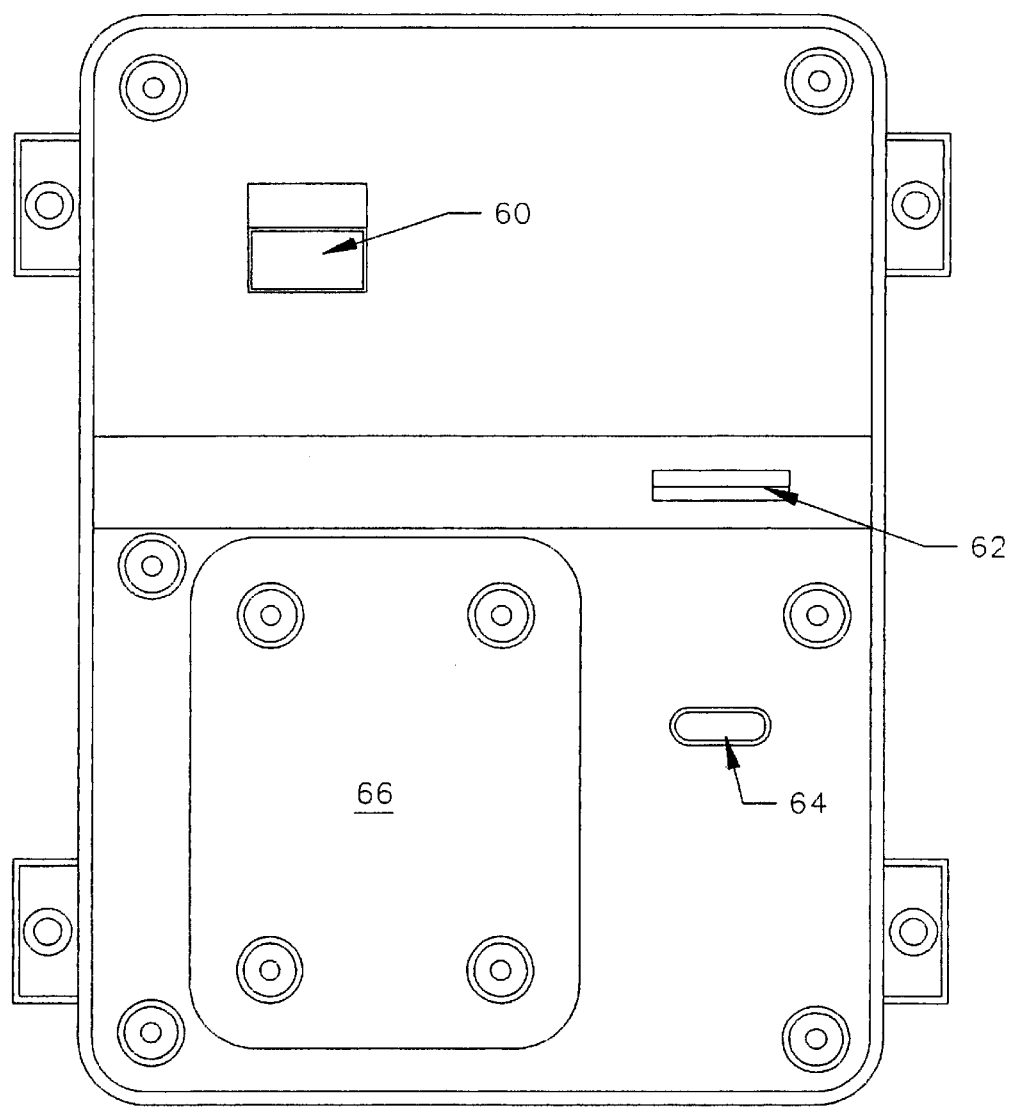
FIG. 6 is a similar view of a unit for individual use.

In FIG. 6 a LCD display 60 is provided as well as a token slot 62, a mechanical meter reading display 64 and battery 66.

What is claimed is:

1. A system for communal prepayment water management, the system comprising:

a management station;

a water control device for controllably dispensing water; and a personal consumer data device, the water control device being remote from the management station, being controllable by the management station and by the personal consumer data device, and being in data communication with both the management station and the personal consumer data device during a water dispensing action, the management station being configured for receiving and writing information directly from and to the personal consumer data device and from and to the personal consumer data device via the water control device so as to validate data and update data on the personal consumer data device, the personal consumer data device being in data communication with the management station when the personal data device is inserted into the prepayment metering unit, the water control device having a water inlet and a water outlet for the flow of water therebetween, a metering unit connected intermediate the water inlet and water outlet for metering the flow of water, a regulator located intermediate the water inlet and water outlet for controlling the flow of water therebetween, a computing unit operatively connected to the metering unit, and a personal consumer data device interface having a port for accepting the personal consumer data device, the personal consumer data device interface and the computing unit being operatively connected to the metering unit and arranged to control the metering unit and the regulator, to monitor a volume of water delivered through the metering unit, and to incrementally decrease a credit remaining in the personal consumer data device based on water volume delivery data, the metering unit being activated by the personal consumer data device being inserted in the personal consumer data device interface, the metering unit being de-activated by the personal consumer data device being removed from the personal consumer data device interface, the metering unit and regulator being de-activatable by the management station, in a first mode of operation, when the personal consumer data device is removed from the personal consumer data device interface, the personal consumer data interface and computing unit direct the metering unit to shut off the flow of water, the personal consumer data device retains a credit from a last incremental credit decrease based on water volume delivery data prior to removing the personal consumer data device from the water control device, and the water control device, upon removal of the personal consumer data device from the personal consumer data device interface, transmits the water delivery volume data to the management station, in a second mode of operation, with the consumer data device inserted in the water control device, the regulator is operated to start and stop the flow of water in compliance with a signal received from the management station, the signal being related to a total credit data remaining on the personal consumer data device, the total credit data being receivable and recordable by the management station for permissibility of a transaction according to available credit and transferable to the personal consumer data device interface for transference to the consumer data device as water is delivered through the water control device so that the recordal of a transaction by the management station is transferable to the personal consumer data device through the water control device.

\* \* \* \* \*